United States Patent
Wagner

[11] Patent Number: 6,149,244
[45] Date of Patent: Nov. 21, 2000

[54] WHEEL HUB ASSEMBLY AND METHOD OF INSTALLING A HUB ON AN AXLE

[75] Inventor: Mark Wagner, Beaverton, Oreg.

[73] Assignee: Consolidated Metco Inc., Portland, Oreg.

[21] Appl. No.: 09/087,132

[22] Filed: May 29, 1998

[51] Int. Cl.[7] .................................................. B60B 37/10
[52] U.S. Cl. ..................... 301/105.1; 29/898.07
[58] Field of Search ...................... 301/105.1, 111, 301/124.1, 131, 126, 137; 384/448; 29/894.321, 894.361, 898.07

[56] References Cited

U.S. PATENT DOCUMENTS

| | | |
|---|---|---|
| 698,944 | 4/1902 | Heinzelman et al. . |
| 1,055,849 | 3/1913 | Zahn . |
| 2,087,684 | 7/1937 | Grimaldi . |
| 2,622,934 | 12/1952 | Phelps . |
| 3,156,506 | 11/1964 | Scheifele et al. . |
| 3,996,966 | 12/1976 | Princell . |
| 4,552,367 | 11/1985 | Fedorovich et al. . |
| 4,666,215 | 5/1987 | Toms, Jr. ................................. 301/5.7 |
| 4,811,992 | 3/1989 | Steiner . |
| 4,900,166 | 2/1990 | Candiard . |
| 4,995,736 | 2/1991 | Haase . |
| 5,174,839 | 12/1992 | Scultz et al. . |
| 5,184,402 | 2/1993 | Kadokawa . |
| 5,328,275 | 7/1994 | Winn et al. . |
| 5,386,630 | 2/1995 | Fox . |
| 5,757,084 | 5/1998 | Wagner . |
| 5,875,550 | 3/1999 | Kohn ............................. 301/105.1 X |
| 5,997,103 | 12/1999 | Wagner ............................. 301/105.1 |

Primary Examiner—Russell D. Stormer
Attorney, Agent, or Firm—Klarquist Sparkman Campbell Leigh & Whinston LLP

[57] ABSTRACT

A wheel hub has inboard and outboard bearings separated by a spacer. A cap is located on an outboard surface of the hub to hold the outboard bearing in place. The cap may be held in place by a cap retainer and may be press fit into the bore. At least one alignment element may be used to substantially align the spacer with the inboard and outboard bearing assemblies during installation of the wheel hub onto an axle.

32 Claims, 6 Drawing Sheets

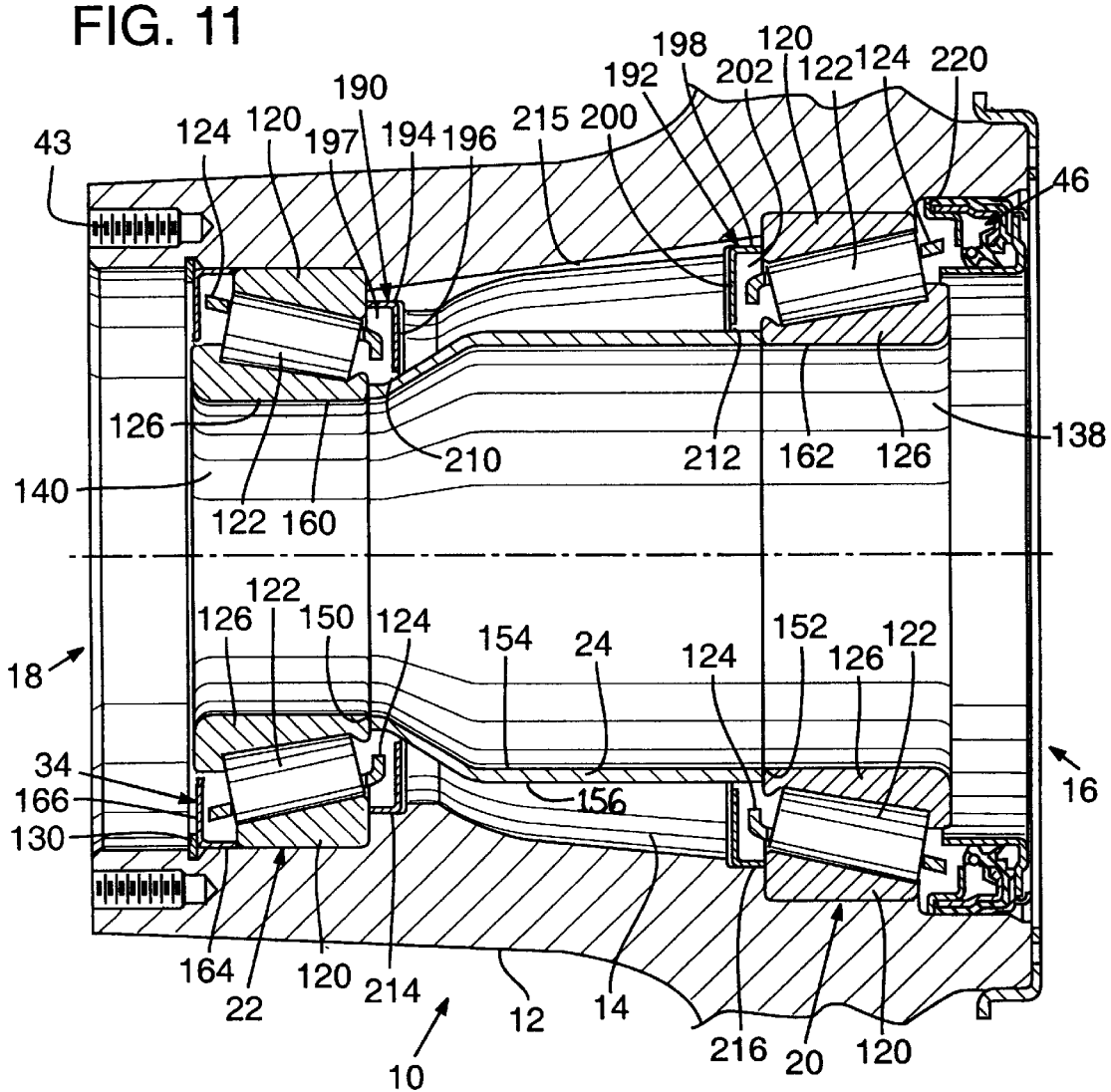

WHEEL HUB ASSEMBLY AND METHOD OF INSTALLING A HUB ON AN AXLE

BACKGROUND OF THE INVENTION

1. Field of the Invention

This invention pertains generally to a wheel hub assembly and method for installing a wheel hub onto an axle and more particularly pertains to installing a heavy-duty wheel hub having bearing assemblies onto an axle.

2. Description of the Related Art

Mounting a hub onto an axle requires a certain degree of finesse. Many heavy-duty hubs have inboard and outboard tapered roller bearings that must be properly positioned and tightened to insure that the hub is securely attached to the axle, but freely able to spin.

Because of the size and weight of most heavy-duty hubs, it is necessary for the installer to use both hands. During installation the hub can become misaligned with the axle causing damage to a bearing seal. Also, as the axle enters the hub, past the inboard bearing, it becomes difficult for the installer to align the outboard bearing, further making it common to jam the inboard bearing on the axle. Finally, mounting the outboard bearing onto the axle is difficult without a means to align it with the axle. Such difficulties increase the time to install the hub, which adds expense to vehicle manufacturers.

U.S. Pat. No. 5,757,084 to Wagner discloses one approach for addressing these problems. However, improved hubs and approaches are nevertheless desirable.

SUMMARY OF THE INVENTION

Accordingly, there is a need in the industry to provide an improved hub and hub installation method which is directed toward overcoming the difficulties of mounting a hub onto an axle. The present invention provides a wheel hub having a hub body with a centrally located axially extending axle bore or cavity within which are mounted an outboard and an inboard bearing assembly. Typically a spacer is provided to maintain a desired axial spacing of the bearing assemblies along the bore.

The hub may also optionally be provided with a temporary alignment member, such as a plug or sleeve, that is inserted into the bore and positioned to engage at least the outboard bearing and the spacer at its outboard end. The temporary alignment member maintains the orientation, and preferably the flush alignment, of inner surfaces of the spacer and the outboard bearing so that as the hub is mounted onto an axle, the axle can slide easily along the inner surface of the spacer into the outboard bearing.

In addition, a cap is coupled to the outboard end of the hub body and assists in holding the outboard bearing in position during installation of the hub on the vehicle axle. The cap preferably includes a hole that is large enough for passage of the temporary alignment member through the hole if a temporary alignment element is used and also for passage of the axle, but not large enough to allow the outboard bearing to pass through it. If no temporary alignment member is used, the hole in the cap need only be large enough for the passage of the axle, but not large enough to allow the outboard bearing to pass through it.

In one form, the cap is annular and inserted or positioned into the outboard end of the bore. A cap retainer, such as a snap ring, may be positioned in the bore and adapted to engage the cap to retain the cap within the bore. The cap may be loosely positioned in the bore, but in a more preferred approach the cap is press fit into the bore.

The cap of an illustrated embodiment is annular with an axially extending first leg portion positioned adjacent to the wall defining a portion of the bore and an inwardly extending second leg portion extending inwardly toward the longitudinal axis of the bore. The first and second leg portions may be at right angles to one another, with the second leg portion extending radially inwardly from an end portion of the first leg portion. As is conventional, the outboard bearing may have an outer cup or race, tapered rollers, a roller cage, and an inner bearing cup or race. The inner race together with the tapered rollers and cage comprise a cone assembly. When this specific form of cap is installed, the first leg portion is positioned outboard of the outboard side of the outer race of the outboard bearing and limits the travel of the outer race of the outward bearing in an outboard direction. In addition, the second leg portion is preferably spaced from the outboard side of the outboard bearing so that it can trap or retain lubricant for the outboard bearing.

This form of cap preferably has a second leg portion with an outboard surface which is positioned axially inboard of the outboard surface of the inner bearing race. Consequently, when the hub is attached to the axle by a mechanical connector, the connector may be tightened to apply a force against the outboard surface of the inner bearing race without engaging the outboard surface of the second leg portion of the cap. Consequently, the axle, mechanical connector and cone assembly are free to rotate without contacting the second leg portion of the cap. In addition, in this configuration, the second leg portion of the cap also preferably has an inboard surface opposite the outboard surface of the second leg portion. The inboard surface of the second leg portion is spaced from the cage so that it does not interfere with rotation of the cone assembly.

The spacer, in accordance with one aspect of an illustrated embodiment, is located within the bore and coupled to the first and second bearing assemblies to maintain the desired spacing of the bearing assemblies along the longitudinal bore. The spacer has an inboard end and an outboard end and includes an axially extending axle receiving opening therethrough. The spacer also has an inner surface bounding the axle receiving opening and an opposed outer surface. The spacer is preferably not connected to the bearings but is free floating. Accordingly, without the temporary alignment member, or an alignment element such as described below, the spacer could shift transversely relative to the axle bore and the axle would have a tendency to catch an inner edge of the outboard bearing assembly during installation. By maintaining a substantial axial alignment of the outboard end of the bearing and the spacer, hub installation is greatly simplified because the axle readily follows an inside surface of the spacer into the inner axle engaging surfaces of the outboard bearing assembly as the hub is pushed onto the axle. By substantial alignment, it is meant that the axis of the opening through the bearing is aligned with the axis of the opening through the spacer such that not enough of the outboard bearing is positioned to block the opening through the spacer to the extent that the axle would hang up on the bearing during insertion.

To assist in substantially aligning the opening through the spacer with the opening through the outboard bearing assembly during installation of the hub onto an axle, at least one alignment element is preferably located within the bore. The at least one alignment element is operable or adapted to substantially align the longitudinal axis of the spacer with the longitudinal axis of the bore and axle receiving opening through the outboard bearing assembly. This alignment element may be formed as part of the hub body projecting from the hub body toward the spacer. Alternatively, at least two spaced apart alignment elements may be provided, one positioned adjacent to the inboard side of the outboard bearing assembly, and the other positioned adjacent to the outboard side of the inboard bearing assembly. Upon completion of the mounting of the hub onto an axle, a gap or clearance is preferably provided between the alignment element or elements and the outer surface of the spacer such that the spacer is free to rotate or otherwise move without engaging the alignment elements.

As depicted in an illustrated embodiment, these alignment elements may be annular with a central opening. The first alignment element may include a first leg portion extending axially in an inboard direction away from the inboard side of the outboard bearing assembly, and a second leg portion extending inwardly, for example radially inwardly, toward the longitudinal axis of the bore at a location spaced from the inboard side of the outboard bearing assembly. The first alignment element is preferably operable to retain lubricant against the inboard side of the outboard bearing assembly. The second alignment element in an illustrated form has a first leg portion extending in an outboard direction away from the outboard side of the inboard bearing assembly, and a second leg portion extending inwardly toward the longitudinal axis of the bore at a location spaced from the outboard side of the inboard bearing assembly. The second alignment element is preferably operable to retain lubricant against the outboard side of the inboard bearing assembly.

As another aspect of an illustrated embodiment, gaps or clearance is provided between the outer surface of the spacer and the respective second legs of the first and second alignment elements when the hub is mounted onto the axle. This permits the sleeve to freely rotate without engaging the first and second alignment elements and also the first and second alignment elements maintain the sleeve in substantial alignment with the inboard and outboard bearings during installation of the axle.

As yet another aspect of the illustrated embodiment, first and second annular recesses may be provided in the interior bore wall of the hub body. These recesses are positioned to receive the respective first and second alignment elements and to retain the first and second alignment elements in place with the second leg of the first alignment element spaced from the outboard bearing assembly and the second leg of the second alignment element spaced from the inboard bearing assembly.

A seal may also be provided at the inboard side of the inboard bearing with a lubrication retaining cap being positioned between the seal and cage of the inboard bearing assembly. The lubrication cap is preferably adapted to or operable to retain lubrication at the inboard side of the inboard bearing assembly.

The present invention thereby relates to improved wheel hub assemblies and methods of installing such assemblies onto an axle.

The present invention relates to the above aspects, features and advantages individually as well as collectively. These and other advantages, objects and features of the present invention will become apparent with reference to the following description and drawings.

Figure 1:
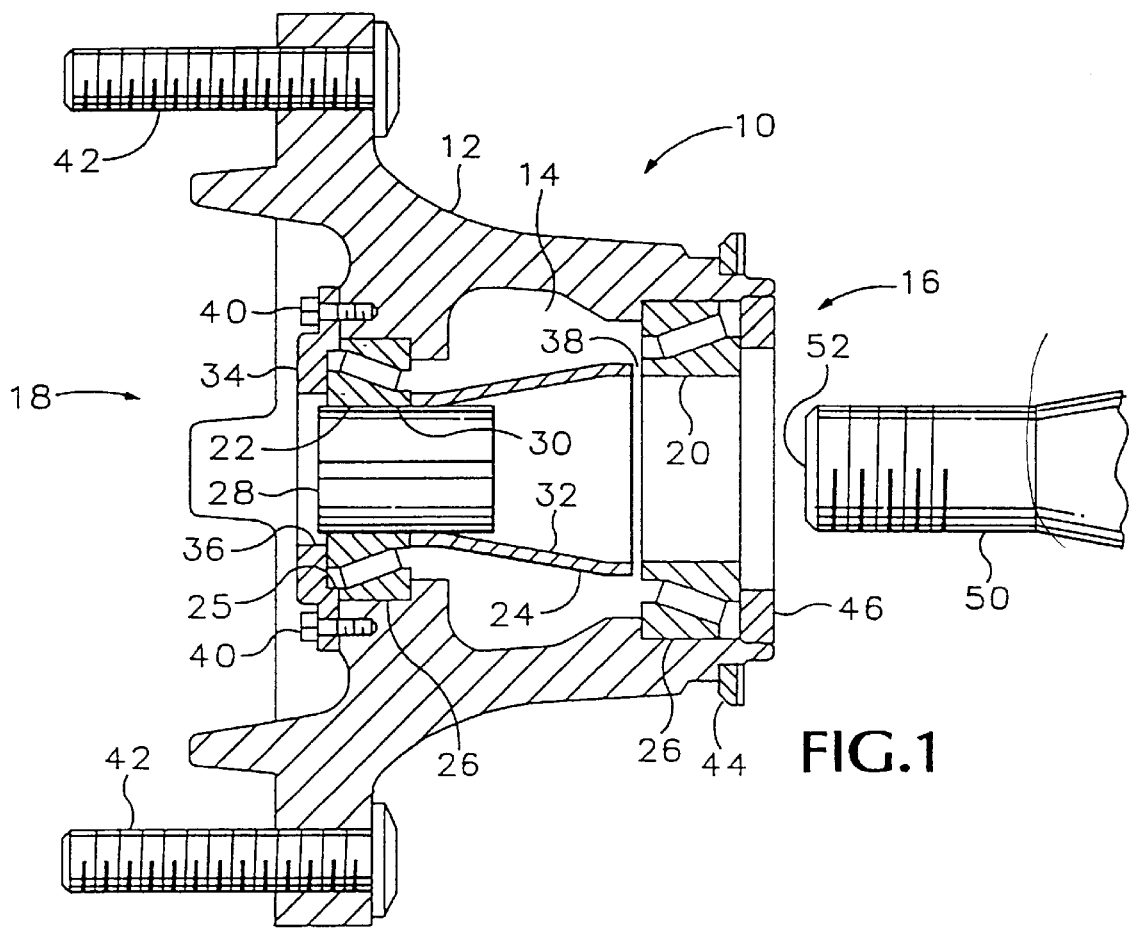
FIG. 1 is a cross-section view of a hub in accordance with one embodiment of present invention and also showing a portion of an axle poised to enter an inboard side of the hub.

FIG. is a partial cross-section view of the hub of FIG. 1 wherein the axle is partially located onto the hub and is pushing a temporary alignment member outward.

Figure 3:
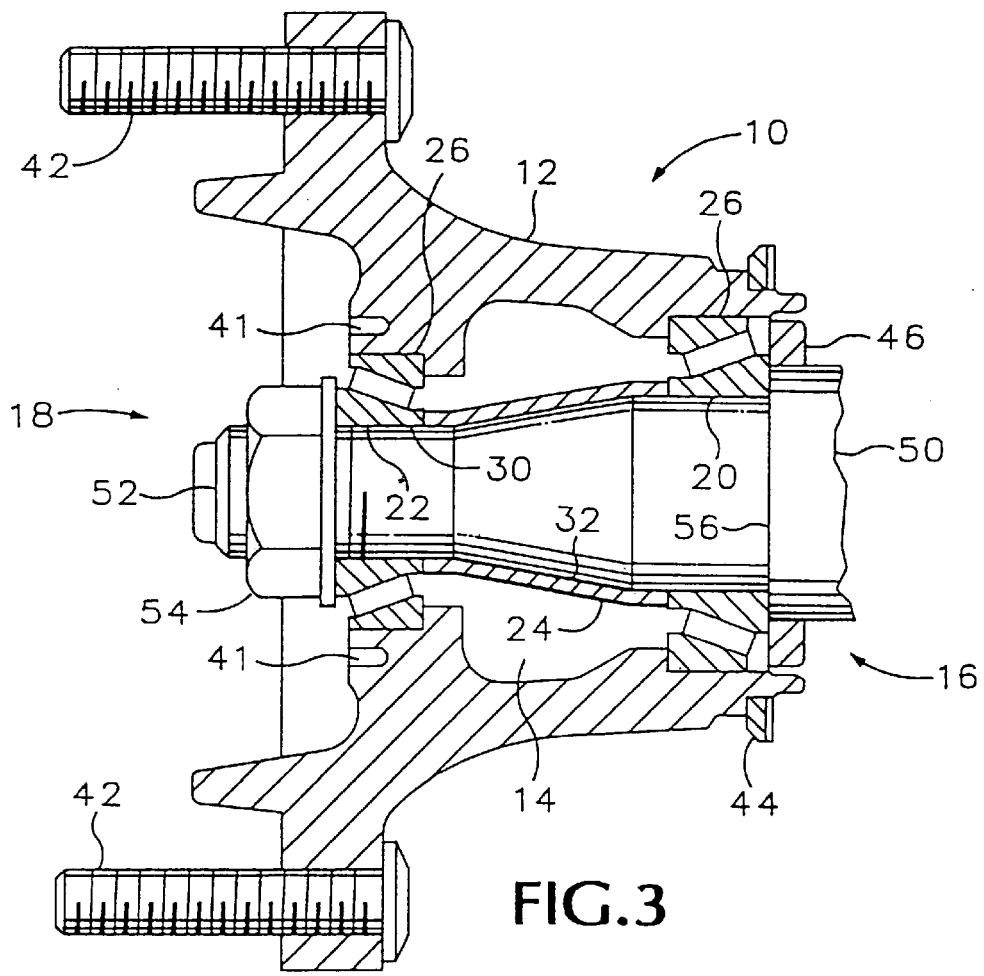
Figure 4:
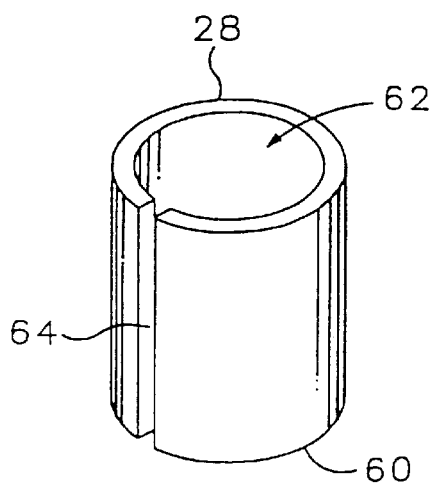

FIG. 3 is a cross-section view of the hub of FIG. 1 wherein the hub is fully installed on the axle. FIG. 4 is a perspective view of a preferred embodiment of one form of a temporary alignment member of the present invention.

Figure 5:
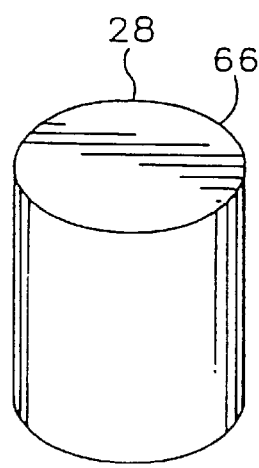

FIG. 5 is a perspective view of an alternative preferred embodiment of the temporary alignment member of the present invention.

Figure 6:
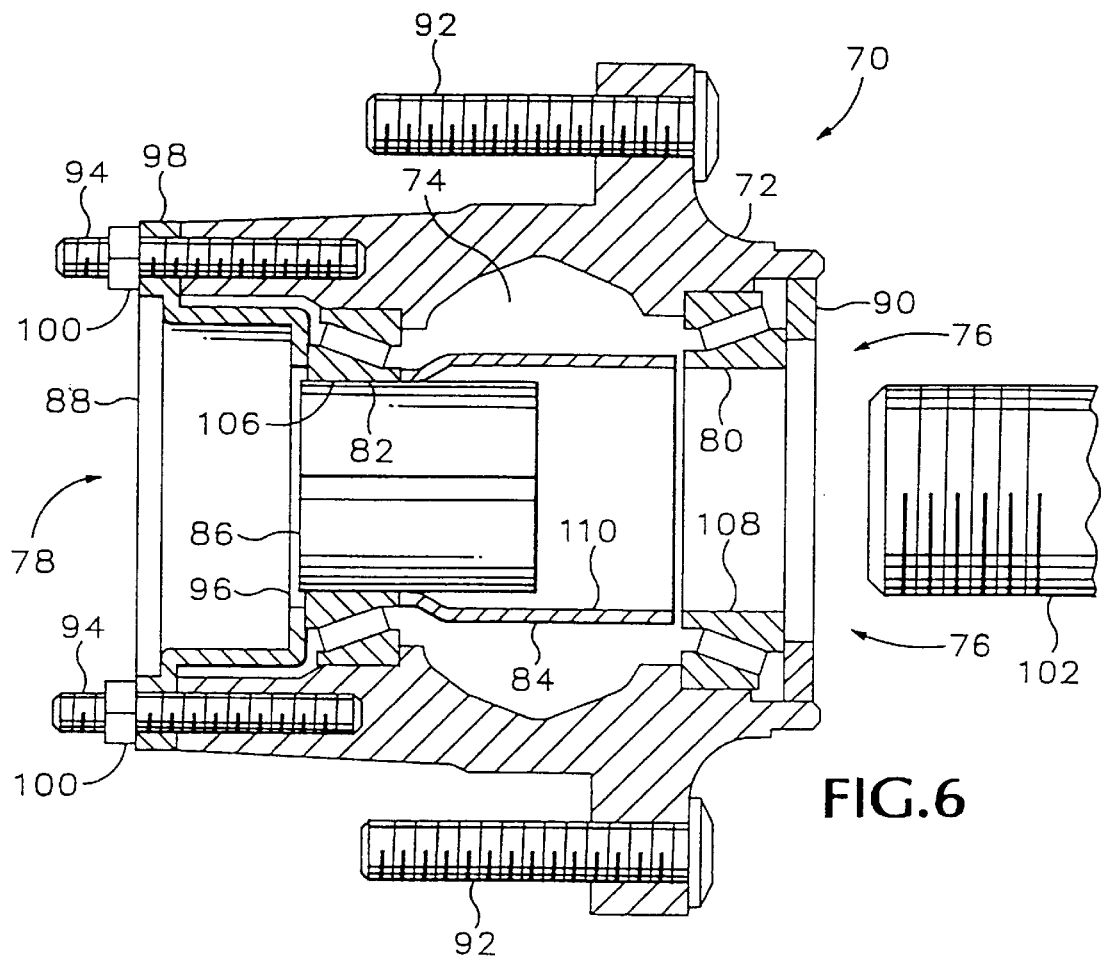

FIG. 6 is a cross-section view of an alternative embodiment of a hub of the present invention wherein the hub is designed to attach to tandem wheels to illustrate the ready applicability of the invention to various hub styles. A portion of an axle is shown poised to enter the hub at an inboard side of the hub.

Figure 7:
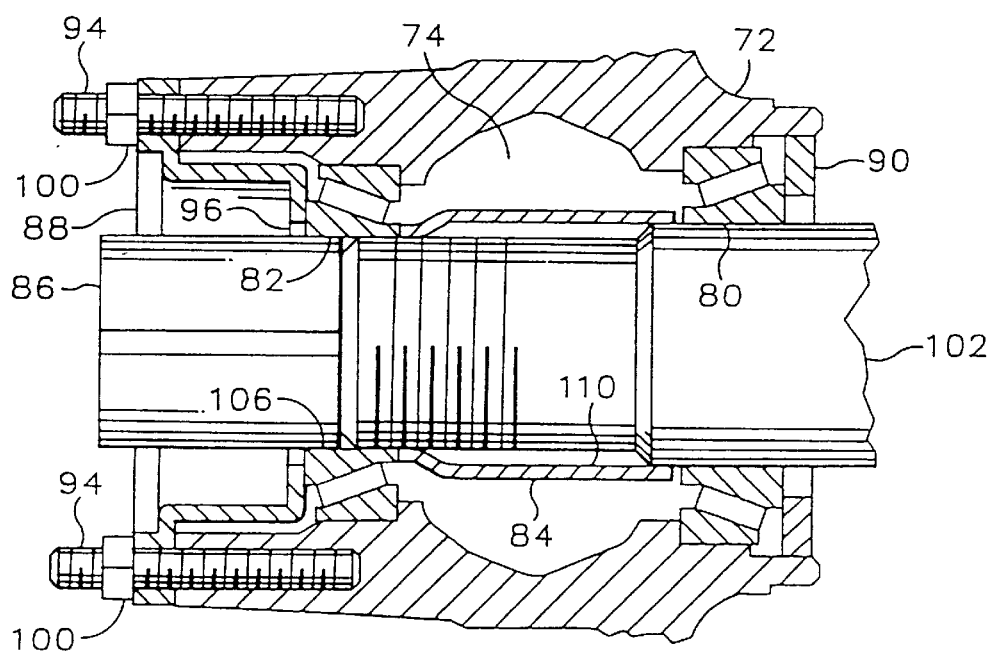

FIG. 7 is a partial cross-section view of the hub of FIG. 6 wherein the axle is partially located in the hub and is pushing a temporary alignment member outward.

Figure 8:
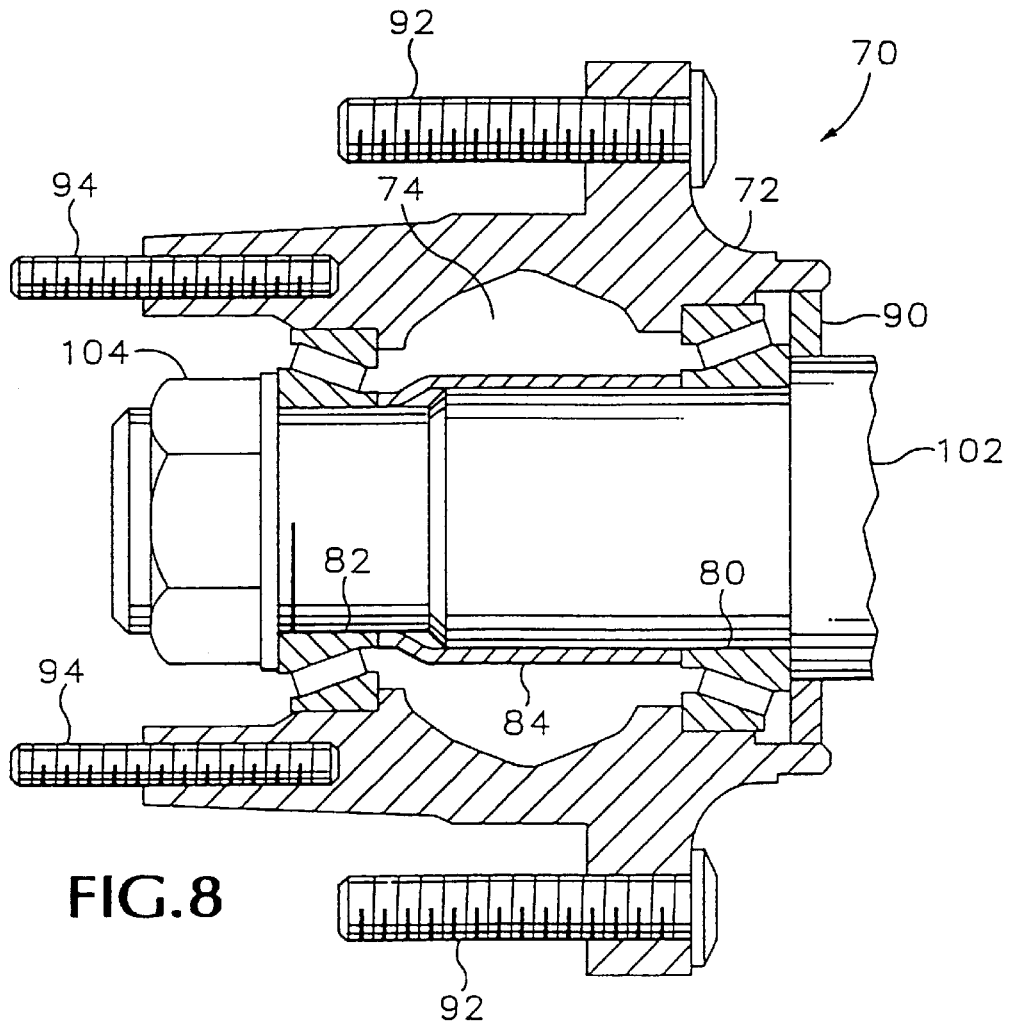

FIG. 8 is a cross-section view of the hub of FIG. 6 showing the hub fully installed on the axle.

Figure 9:
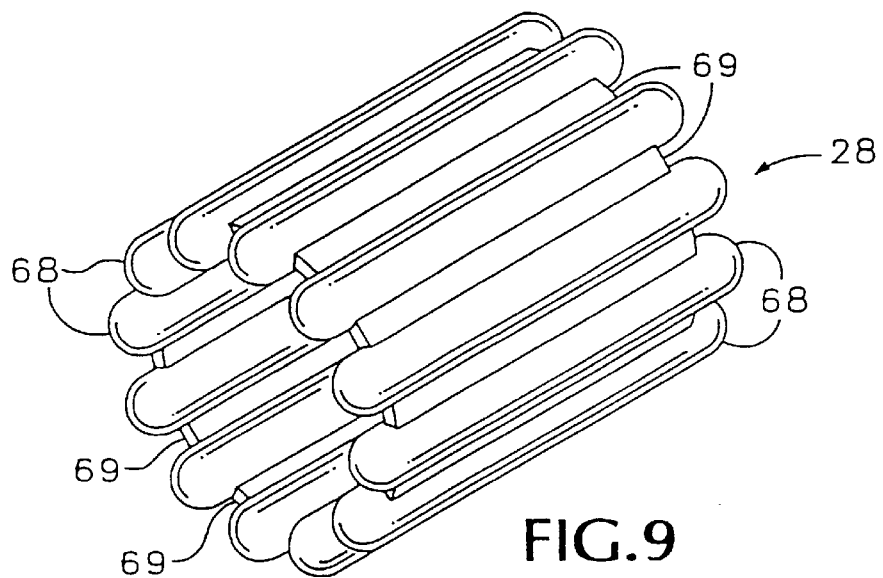

FIG. 9 is a perspective view of an alternate embodiment of a temporary alignment member.

Figure 10:
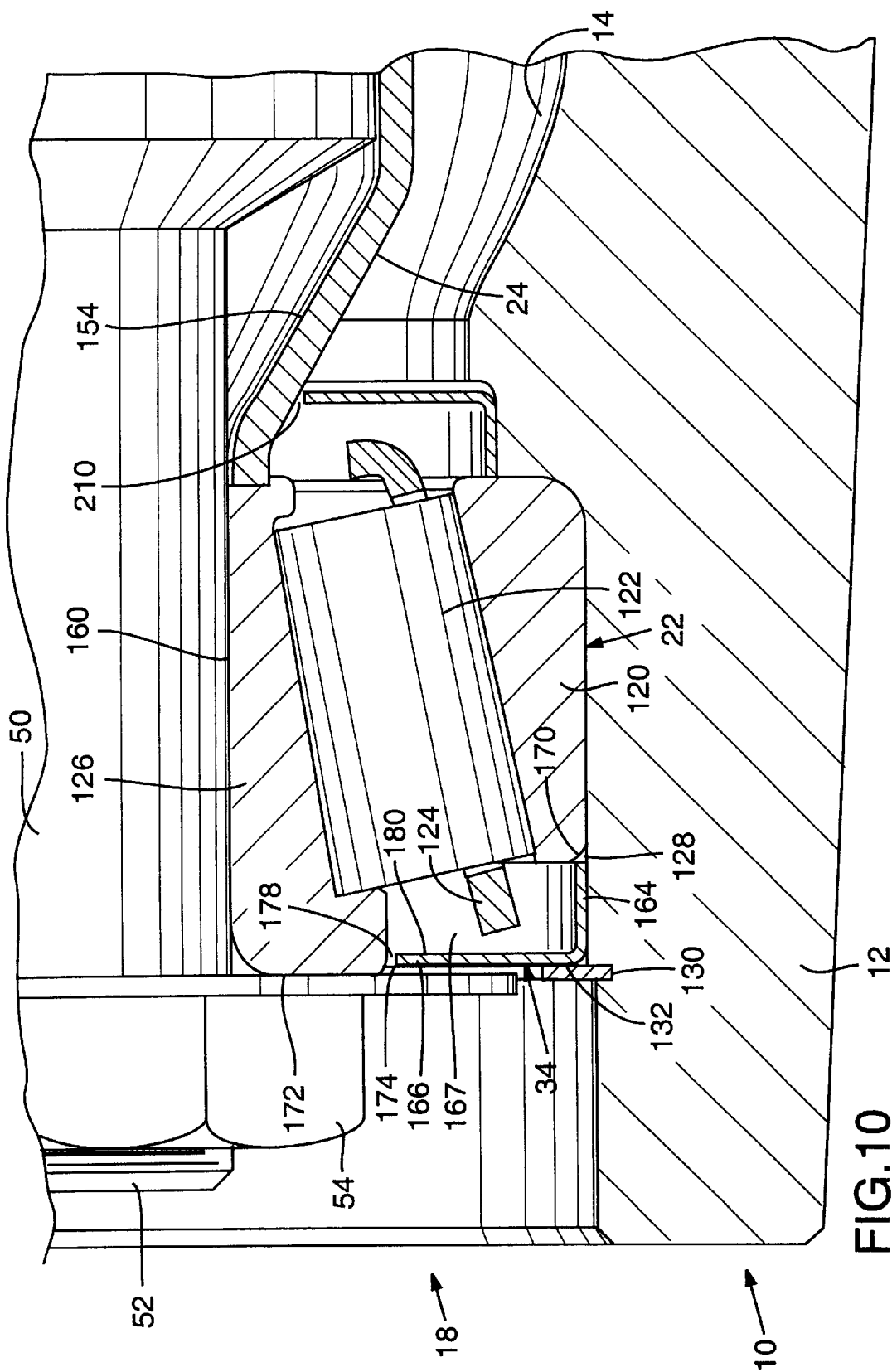

FIG. 10 is a partial cross-section view of a portion of a hub assembly mounted to an axle with an alternative form of cap.

FIG. 11 is a cross-section view of a hub including the cap of the form shown in FIG. 10 and also including first and second internal alignment elements.

DETAILED DESCRIPTION OF THE PREFERRED EMBODIMENTS

Figure 2:
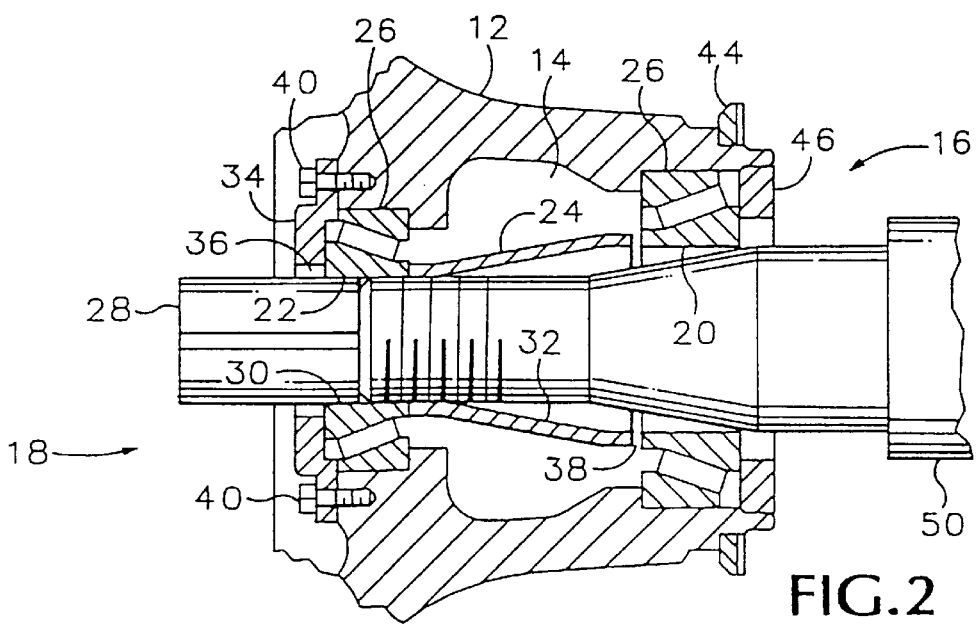

FIGS. 1–3 show a cross-section, or a portion thereof, of a hub assembly 10 and its installation sequence. The hub assembly 10 is intended for use with a single wheel unit such as is commonly found on the front wheels of trucks. The hub 10 includes a main body 12 which includes an axial bore 14 extending from an inboard side 16 to an outboard side 18 of the hub. Within the bore 14 are an inboard bearing assembly 20, an outboard bearing assembly 22 and a spacer 24. The bearings 20, 22 are tapered roller bearings with rollers mounted on beveled races or cups 26. As shown in FIGS. 10 and 11, as is conventional, the inboard and outboard bearing assemblies 20 and 22 each include an annular outer cup or race 120, a plurality of tapered rollers 122 positioned within an annular roller cage 124, and an annular inner cup or bearing race 126. The inner race 126 together with the tapered rollers and cage comprise a cone assembly. As best seen in FIG. 10, the outer-most edge portion of the outboard side 128 of the outer race 120 of outboard bearing 22 may be provided with a chamfer to accommodate the positioning of a portion of a FIG. 10 form of cap 34 as explained below.

With further reference to FIGS. 1–3, also located within the bore 14 is a temporary alignment member 28 (shown in one preferred embodiment as a sleeve 28) which is in contact with an inside surface 30 of the outboard bearing and an inside surface 32 of the spacer 24. Preferably, the sleeve 28 is radially resilient so that it may be radially compressed and inserted into the outboard bearing 22 and spacer 24 and thereafter released so it expands to be in frictional contact with the inner surfaces 30 and 32. The sleeve 28 thereby maintains a flush alignment of the inner surface 30 of the outboard bearing 22 with the inner surface 32 of the spacer 24 at the spacer's outboard end. Additionally, due to the holding power of the frictional fit of the sleeve with the spacer and outboard bearing, an inboard end of the spacer 24 is also urged into approximate flush alignment with the inboard bearing 20. Such a temporary alignment element may also be used in combination with a cap of the form shown in FIG. 10.

Affixed or otherwise directly or indirectly coupled to the outboard end 18 of the hub body 12 is a cap 34 (see FIGS. 1–3) that holds the outboard bearing 22 in place. The cap 34 in this form may be provided with a recess 25 to receive the outboard surface of the bearing. The cap may be of any convenient shape, but is typically annular. The cap includes an aperture 36 that is positioned relative to the bore (e.g., overlaying the bore opening) and large enough to allow the sleeve 28 to pass through it if a sleeve or other temporary alignment member is used, yet the hole 36 is small enough so that the cap 34 is able to securely maintain the outboard bearing 22 in its bearing cup 26. Preferably, the cap 34 of FIGS. 1–3 is attached to the hub body 12 by means of a plurality of bolts 40 (or plastic clips, not shown) which pass through the cap and into threaded bores 41 in the body 12. The FIG. 10 form of cap 34 may be loosely received in the bore and retained in place by a cap retainer with a snap ring 130 (such as a C-shaped ring) being one specific form of retainer. The illustrated ring 130 is positioned in a recess formed in the hub body and is also positioned to engage an outboard surface 132 of the cap to retain the cap in place. Alternatively, and preferably, the FIG. 10 form of cap is press fit within the bore. In this case, the cap retainer may be eliminated, but is preferably included to prevent the cap 34 from working free and moving in an outboard direction away from the outboard bearing.

The illustrated spacer 24 in FIGS. 1–3 is located between the inboard bearing 20 and the outboard bearing 22, and, in this embodiment, is tapered from the inboard bearing to the outboard bearing. Other configurations of spacers may be used, although the tapered inner surface assists in guiding the end of the axle through the bore during installation. When the hub is being shipped, the spacer is held in place by the sleeve 28, if used, and/or by at least one alterative alignment element described below in connection with FIGS. 10 and 11.

In the FIGS. 1–3 illustrated embodiment with tapered bearings, the spacer is preferably slightly shorter than a distance between the inboard and outboard bearings when the bearings are not subjected to axial forces. That is, without axial pressure on the bearings the spacer will not contact both the inboard bearing and the outboard bearing simultaneously. Thus, a small space 38 is created at one end or the other between the spacer 24 and its adjacent bearing 20 or 22. As shown in FIG. 1, for example, the space 38 is located between the inboard end of the spacer 24 and the inboard bearing 20. As will be explained below in greater detail, the length of the spacer 24 and the attendant space 38 is provided so that as the hub is tightened onto the axle, the bearings can shift slightly axially in their cups 26 and move toward one another to adjust the bearings. However, the length of the spacer limits the amount of axial movement of the bearings.

As shown in FIGS. 1–3, the hub also includes wheel mounting studs 42 for connecting a wheel to the hub. Threaded stud receiving openings, such as one labeled as 43 in FIG. 11, may alternatively be provided. In addition, an ABS (anti-lock brake system) tone ring 44 (FIGS. 1–3) may be mounted at the inboard end of the body 12. An oil seal 46 is also preferably mounted at the inboard end of the body to retain inboard bearing 20 in place.

One preferred method of installing the hub onto a wheel axle 50 will now be explained with reference to FIGS. 1–3 in sequence. Beginning with FIG. 1, the hub 10 is adjacent the end 52 of axle 50 so that the hub's inboard opening of the bore 14 is facing the axle. Thereafter, the hub is pushed onto the axle 50 so that the axle end 52 enters the bore 14 through its inboard end. The end 52 of the axle may contact the inner surface 32 of the spacer 24 and be guided by this surface as the installer slides the hub further onto the axle 50. Eventually, the axle end 52 will come into contact with the sleeve 28.

The installer then needs to apply slightly more pressure so that the axle 50 begins to force the sleeve 28 outward through the aperture 36 in the cap as is shown in FIG. 2. The sleeve 28 will maintain the alignment of the inner surfaces 30 and 32 of the outboard bearing and the spacer, respectively, until the axle 50 pushes the sleeve 28 past the spacer 24, at which point the axle is aligned with the outboard bearing 22. The installer then continues to push the hub onto the axle and the sleeve 28 passes completely through the aperture 36 and falls away.

Thereafter, continued pushing by the installer will cause the axle 50 to protrude through the hole 36. The installer then firmly seats the bearings onto the axle and removes the cap 34. An axle nut 54 is then threaded onto the axle and tightened. As the nut 54 is tightened it bears against an outboard surface of the outboard bearing 22 thereby pressing the roller bearing firmly into its cup 26. Meanwhile, the inboard bearing 20 has an inboard end that is pressing against a shoulder 56 of the axle 50. Accordingly, tightening the axle nut 54 causes the bearings 20 and 22 to become seated in their respective cups 26. Thus, the bearings are moved toward one another through the distance of the space 38; that is, until both bearings come into contact with the ends of the spacer 24 as shown in FIG. 3. Thereafter, continued tightening of the nut 54 to the desired torque completes the bearing adjustment.

Embodiments of the temporary alignment member 28 are shown in FIGS. 4, 5 and 9. In FIG. 4, the alignment member 28 is tubular (the sleeve) having an outer wall 60 defining a central opening 62. The wall 60 is provided with a slit 64 and is made of a material that is somewhat resilient. Accordingly, the slit 64 allows the alignment member 28 to be radially resilient. A suitable material for this purpose is ABS tubing having a proper diameter. The outer cross-sectional dimension, in this case the outer diameter, when uncompressed or unreduced is slightly larger than the inner diameter of bearing 22 and the outboard end of sleeve 28. When inserted in place, the diameter of the sleeve is reduced and the resilient nature of the sleeve causes it to bear against the spacer and bearing to be held in place.

In FIG. 5, the alignment member 28 is represented as a cylinder or plug 66 of resilient material such as Styrofoam, rubber, or other elastomeric material. Alternatively, the alignment member 28 could have a triangular or other non-circular cross-section. In addition, a properly sized inflatable object may have the correct properties to become the alignment member 28.

In FIG. 9 the alignment member 28 is a molded or extruded plastic having a plurality of longitudinal ribs 68 spaced apart by intermediate webs 69. A suitable material is chosen so that the alignment member is radially resilient.

In general, the alignment member 28 may be of any shape which holds the desired bearing and spacer components in alignment and of a design such that it remains in position, either by frictional contact or otherwise during shipment of the hub assembly.

FIGS. 6–8 show a cross-section of a hub 70 of the type that is designed to attach to double, or tandem, wheel units.

In many respects the hub 70 has many functional characteristics in common with the hub 10 shown in FIGS. 1–3. The hub 70 includes a hub body 72 having an axial bore 74 extending from an inboard end 76 to an outboard end 78. Also, as before, within the bore 74 is an inboard bearing assembly 80, an outboard bearing assembly 82 and a spacer 84.

The hub also includes a temporary alignment member, again represented as a sleeve 86 and a cap 88 near the outboard end 78. In addition, as before, the hub includes an oil seal 90 at the inboard end 76 to hold the inboard bearing 80 in its cup.

Significant differences between the hub 70 and the hub 10 include a double set of wheel studs 92 and 94 for connecting to wheels and the drive axle. Accordingly, the different geometry required for the double set of studs also requires that the cap 88 be correspondingly differently shaped. As shown, the cap is substantially cup-shaped having an aperture 96 near the outboard bearing 82. The cap 88 also includes a flange 98 having a plurality of holes so that it may fit down over the studs 94. Nuts 100 thread onto the studs 94 and hold the cap 88 in place. Of course, the cap may be otherwise held in place.

Additionally, the spacer 84 is of a different configuration to accommodate the configuration of the hub 70. However, as before, the spacer is tapered from its inboard end to its outboard end so that it may be in flush alignment with an inner surface 106 of the inboard bearing 80 and an inner surface 108 of the outboard bearing 82. Also, this tapered shape again assists in guiding the end of the axle through the hub assembly during installation. The sleeve 86 holds the outboard end of the spacer 84 in flush alignment with the outboard bearing 82.

Installation of the hub 70 is substantially as described above in connection with hub 10. Initially, the inboard end 76 of the hub 70 is located near an axle 102 and the hub is pushed onto the axle so that the axle enters the bore 74. The axle may slide along the inside surface 110 of the spacer 84 until it comes into contact with the sleeve 86. Thereafter, continued pushing on the hub will cause the axle to eject the sleeve 86 through the cap's aperture 96 so that the axle engages the inner surface 106 of the outboard bearing 82 just as the sleeve 86 evacuates that location insuring that the axle 102 slides easily and surely through the bearing 82.

By continuing to push the hub onto the axle, the installer will cause the sleeve 86 to fall away and thereafter the axle 102 will protrude through the aperture 96 in the cap 88. As before, in this type of a hub, an axle nut 104 is threaded onto the axle and tightened eventually causing the bearings 80 and 82 to more toward one another until they contact both ends of the spacer 84.

It should be noted that many details of hub mounting have been left out of the above description as they are considered well known in the art. For example, axle nuts will typically be secured to the axle through one or more commonly known means such as the use of castellated nuts and cotter pins, locking nuts, or other means of securement. Additionally, it is necessary to pack the hub with grease or oil before use. There are many other expedients well known to those versed in the art which are outside the subject of the invention.

With reference to FIGS. 10 and 11, an alternative embodiment is disclosed. As shown in FIG. 11, the spacer 24 is designed to maintain the desired axial spacing of the bearing assemblies along the longitudinal bore. More specifically, the spacer has an outboard end 150 and an inboard end 152 positioned to, in this case, engage the inner bearing races 126 of the respective outboard and inboard bearing assemblies to thereby maintain the desired spacing between the bearing assemblies. The spacer 24 also has an interior surface 154 which is annular and bounds an axle receiving opening extending through the spacer through which the axle is inserted as shown in FIG. 10. The spacer 24 also has an exterior or outer surface 156 opposed to the inner surface 154. In addition, the inner races of the outboard and inboard bearing assemblies have respective interior axle engaging surfaces 160, 162 which are sized to engage the axle when the hub assembly is installed.

Although the cap 34 shown in FIGS. 10 and 11 may take other forms, the illustrated cap is annular with an axially extending first leg portion 164 which is positioned adjacent to a portion of the wall of the hub bore and a second leg portion 166 extending inwardly (in this case, radially inwardly) toward the longitudinal axis of the bore. In the illustrated form of cap 34, legs 164 and 166 extend at a ninety degree angle with respect to one another with leg 166 projecting inwardly from the outboard-most portion of leg 164. Preferably, cap 34 is monolithic. Although the cap 34 may be loosely received or otherwise secured within the bore, most preferably the cap is press fit in place with the outer surface of leg portion 164 engaging a portion of the bore defining wall of the hub. The cap retaining ring 130 in the illustrated embodiment engages an outboard surface 132 of the cap 34 to assist in retaining the cap in place. During installation of the cap 34, the inboard end 170 of leg portion 164 may be compressed into the chamfered region 128 of the bearing race 120. Cap retainer 130 thus maintains the cap 34 in place with the leg portion 164 held tightly against the outer race 120 of the outboard bearing assembly 22. Consequently, the cap limits the travel of the outer race of the outboard bearing assembly in an outboard direction. In addition, the illustrated second leg portion 166 is operable to retain lubricant in a pocket 167 formed at the outboard side of the rollers 122 and outer race 120.

In the illustrated form of cap, the outboard surface 132 of cap leg portion 166 is positioned axially inwardly from the outboard side 172 of the inner bearing race 126. Consequently, a gap 174 is provided between these two surfaces. As a result, when a mechanical connector, such as nut 54, is tightened to attach the hub to the axle, a force is applied against the outboard surface 172 of the inner bearing race 126 without engaging the outboard surface 132 of the second leg portion of the cap. Consequently, the axle, mechanical connector and cone assembly (again, the cone assembly being inner cup 126, rollers 122 and cage 124) are free to rotate without contacting the second leg portion of the cap. A gap 178 is also provided between the radially inward-most end of leg portion 166 and the inner bearing cup 126 to also provide clearance for this rotation. Also, when the hub is mounted onto the axle, as is apparent from FIG. 10, the inboard surface 180 of leg portion 166 is spaced from the cage 124 to again permit free rotation of the cone assembly without contacting the cap.

At least one alignment element may be located within the bore which is adapted or operable to substantially align the longitudinal axis of the spacer with the longitudinal axis of the bore. In one form, the spacer may be formed as part of the hub and project inwardly from the hub toward the outer surface 156 of the spacer 24. The alignment element maintains the sleeve in the desired alignment to facilitate installation of the axle through the inboard bearing, the sleeve and outboard bearing. Consequently, although it may still be used, the temporary alignment member which is pushed through the hub assembly during hub installation may be omitted. The at least one alignment element may be located centrally between the inboard and outboard bearing assemblies or at any other desired location such as adjacent to the inboard side of the outboard bearing assembly.

In a specifically illustrated embodiment which is best seen in FIG. 11, the at least one alignment element comprises a first alignment element 190 positioned adjacent to the inboard side of the outboard bearing assembly and a second alignment element 192 positioned adjacent to the outboard side of the inboard bearing assembly. In the illustrated form, each of the first and second alignment elements 190, 192 are annular, monolithic, and include a central opening which is larger in cross-sectional dimension than the cross-sectional dimension of the sleeve at the location of the respective alignment elements.

The first alignment element 190 includes a first leg portion 194 extending axially in an inboard direction away from the inboard side of the outboard bearing assembly and a second leg portion 196 extending inwardly, in this case radially inwardly from the inboard-most portion of the first leg portion, toward the longitudinal axis of the bore. Leg portion 196 is spaced from the inboard side of the outboard bearing assembly and from the cage 124. A lubricant retaining pocket 197 is thus provided at the inboard side of outboard bearing assembly 22 by alignment element 190. The second alignment element has a first leg portion 198 extending in an outboard direction away from the outboard side of the inboard bearing assembly 20 and a second leg portion 200 extending inwardly (in this case radially inwardly from the outboard-most portion of leg portion 198) toward the longitudinal axis of the bore. In the illustrated form, leg portion 200 is spaced from the outboard side of the inboard bearing assembly. The second alignment element is thus adapted and operable to retain lubricant in a pocket 202 against the outboard side of the inboard bearing assembly. The pocket 202 is similar to the pocket 197 provided by alignment element 190.

Upon installation of the hub assembly onto the axle 50, clearance is provided between the outer surface 156 of the spacer and the alignment elements 190, 192 such that the spacer is free to rotate without interference by the alignment elements. As best seen in FIGS. 10 and 11 (which, for purposes of illustration depicts the bearings and spacer 24 in alignment even though the axle has yet to be installed), a gap 210 exists between the outer surface 156 of the spacer and the second leg 194 of first alignment element 190. In addition, a gap 212 exists between the outer surface 156 of the spacer and the end of second leg portion 200. of second alignment element 192. These gaps are provided when the hub is mounted to the axle. Consequently, the sleeve is free to rotate without engaging the first and second alignment elements. Moreover, during installation of the hub onto the axle, the alignment elements 190, 192 substantially align the sleeve with the inboard and outboard bearings during installation of the axle. Although variable, as one specific example, the gaps are 0.06 inch. During installation, the gaps allow the axis of the sleeve 24 to shift out of alignment to only a limited extent relative to the axis of inner surfaces 138 and 140 of the inboard and outboard bearing assemblies. As a result, during installation the axle is guided by the interior surface 154 of the sleeve through the outboard bearing assembly without tending to hang up and dislodge the outboard bearing assembly from the hub.

In the form shown in FIG. 11, the hub is provided with first and second spaced apart annular recesses 214, 216 for receiving the respective first and second alignment elements. The hub thus retains the first and second alignment elements in position with the second leg of the first alignment element spaced from the outboard bearing assembly and the second leg of the second alignment element spaced from the inboard bearing assembly. The alignment elements may be press fit or loosely inserted into these recesses. The hub in FIG. 11 also has an axially extending slot 215 recessed into the hub from the wall bounding the bore or the hub.

As an option, a lubrication retaining cap 220, such as of an annular stepped form shown in FIG. 11, may be positioned between the seal 46 and the inboard side of the cage of the inboard bearing assembly. The lubrication cap 220 is adapted to retain lubrication at the inboard side of the inboard bearing assembly.

Thus, in accordance with the embodiments of FIGS. 10 and 11, a temporary alignment member may be omitted. Instead, at least one alignment element is used which in the illustrated form remains installed with the hub assembly following the mounting of the hub assembly onto the axle.

Numerous characteristics and advantages of the invention have been set forth in the foregoing description, together with details of the structure and function of the invention. The novel features hereof are pointed out in the appended claims. The disclosure is illustrative only, and changes may be made in detail, especially in matters of shape, size, and arrangement of parts within the principle of the invention to the full extent indicated by the broad general meaning of the terms in the claims. For example, the invention is not limited to the hub designs, caps, alignment members and bearing types of the illustrated embodiments.

I claim:

1. A method of installing a wheel hub on an axle, the wheel hub including a hub body having a bore bounded by a wall, the bore extending from an outboard side of the body to an inboard side of the body, the hub further including an inboard bearing and an outboard bearing, each with a respective inboard side and outboard side, and a spacer located within the bore in position to maintain spacing between the bearings, wherein the spacer and the bearings each have an inner surface which defines an axle receiving opening therethrough, the spacer also having an outer surface opposed to the inner surface of the spacer, the method comprising:

(a) providing at least one alignment element in position to engage at least the outer surface of the spacer during installation of the wheel hub onto the axle so as to substantially align the inner surface of the spacer with the inner surfaces of the inboard and outboard bearings;

(b) installing a cap on the body, the cap having an aperture that is large enough to receive the axle therethrough, the cap being in a position to retain the outboard bearing in the bore;

(c) positioning the inboard side of the bore onto the axle and guiding the hub further onto the axle until the axle protrudes at least partially through the cap;

(d) attaching the hub to the axle by a mechanical connector; and (e) providing a space between the at least one alignment element and the outer surface of the spacer such that the spacer is free to rotate relative to the hub without engaging the at least one alignment element.

2. A method according to claim 1 in which the act of installing the cap comprises the act of positioning an annular cap into the outboard end of the bore.

3. A method according to claim 2 including the act of installing a cap retainer in the bore outboard of the cap to retain the cap in the bore.

4. A method according to claim 3 in which the act of installing the cap comprises the step of press fitting the cap into the bore.

5. A method according to claim 2 in which the bore has a longitudinal axis, the annular cap has an axially extending first leg portion positioned adjacent to the wall of the bore and an inwardly extending second leg portion extending inwardly toward the longitudinal axis of the bore, the outboard bearing having an outer cup or race, tapered rollers, a cage and an inner bearing cup or race, the inner race together with the tapered rollers and cage comprising a cone assembly, wherein the act of installing the cap comprises the step of positioning the first and second leg portions such that the first leg portion limits the travel of the outer race of the outboard bearing in an outboard direction and such that the second leg portion traps lubricant for the outboard bearing, the inner bearing race having an outboard surface, the second leg having an outboard surface which is positioned axially inboard of the outboard surface of the inner bearing race, and wherein the act of attaching the hub to the axle by a mechanical connector comprises the act of tightening the mechanical connector to apply a force against the outboard surface of the inner bearing race without engaging the outboard surface of the second leg portion of the cap, the second leg portion of the cap also having an inboard surface opposite the outboard surface of the second leg portion, the inboard surface of the second leg portion being spaced from the cage, whereby the axle, mechanical connector and cone assembly are free to rotate without contacting the second leg portion of the cap.

6. A method according to claim 1 in which the act of providing at least one alignment element comprises the act of positioning a first alignment element adjacent to the inboard end of the outboard bearing between the spacer and the wall of the bore and positioning a second alignment element adjacent to the outboard end of the inboard bearing between the spacer and the wall of the bore.

7. A method according to claim 6 in which each of the first and second alignment elements are annular and include a central opening, the first alignment element including a first leg portion extending axially in an inboard direction away from the inboard side of the outboard bearing and a second leg portion extending inwardly toward the longitudinal axis of the bore at a location spaced from the inboard side of the outboard bearing, the first alignment element trapping lubricant against the inboard end of the outboard bearing, the second alignment element having a first leg portion extending in an outboard direction away from the outboard side of the inboard bearing and a second leg portion extending inwardly toward the longitudinal axis of the bore at a location spaced from the outboard end of the inboard bearing, the second alignment element trapping lubricant against the outboard side of the inboard bearing, and wherein the act of providing a space comprises the act of providing a gap between the outer surface of the spacer and the respective second legs of the first and second alignment elements when the hub is attached to the axle by the mechanical connector, whereby the sleeve is free to rotate without engaging the first and second alignment elements and whereby the first and second alignment elements maintain the sleeve in substantial alignment with the inboard and outboard bearings during installation of the axle.

8. A method according to claim 7 including the act of providing first and second spaced apart annular recesses in the interior bore wall of the hub body to receive the respective first and second alignment elements to thereby retain the first and second alignment elements in position with the second leg of the first alignment element spaced from the outboard bearing and the second leg of the second alignment element spaced from the inboard bearing.

9. A method according to claim 6 further including the act of positioning a seal at the inboard side of the inboard bearing and a lubrication cap between the seal and inboard side of the inboard bearing with the lubrication retaining cap trapping lubrication at the inboard side of the inboard bearing.

10. A method according to claim 1 in which the act of providing a space comprises providing the space upon attaching the hub to the axle.

11. A method according to claim 5 wherein the act of positioning the first and second leg portions comprises positioning the inboard end of the first leg portion in engagement with the outer race of the outboard bearing.

12. A wheel hub assembly providing easy mounting onto an axle, comprising:

a hub body having an inboard side and an outboard side and a longitudinal bore through the body, the bore extending from the inboard side of the hub to the outboard side of the hub, the bore being bounded by a wall;

an outboard bearing assembly located within the bore adjacent to the outboard side of the hub body, an inboard bearing assembly located within the bore adjacent to the inboard side of the hub body, the outboard bearing assembly and the inboard bearing assembly each having an inner surface of a cross sectional dimension which is sized to engage an axle inserted through the bore and bearing assemblies, the outboard and inboard bearing assemblies each having respective inboard and outboard sides;

a spacer located within the bore and coupled to the first and second bearing assemblies to maintain a desired spacing of the bearing assemblies along the longitudinal bore, the spacer having an inboard end and an outboard end and including an axially extending axle receiving opening therethrough, the spacer having an inner surface bounding the axle receiving opening and an opposed outer surface;

at least one alignment element located within the bore and sized and positioned for coupling to the outer surface of the spacer during assembly of the wheel hub so as to substantially align the longitudinal axis of the spacer with the longitudinal axis of the bore; and a cap coupled to the outboard end of the bore in a position to retain the outboard bearing assembly within the bore.

13. A wheel hub assembly according to claim 12 in which the cap comprises an annular cap inserted into the outboard end of the bore.

14. A wheel hub assembly according to claim 13 including a cap retainer positioned in the bore to retain the cap in the bore.

15. A wheel hub assembly according to claim 14 in which the cap is press fit into the bore.

16. A wheel hub assembly according to claim 13 in which the bore has a longitudinal axis, the annular cap has an axially extending first leg portion positioned adjacent to the wall of the bore and an inwardly extending second leg portion extending inwardly toward the longitudinal axis of the bore, the outboard bearing assembly having an outer cup or race, tapered rollers, a cage and an inner bearing cup or race, the inner race together with the tapered rollers and cage comprising a cone assembly, wherein the first and second leg portions of the cap are in position such that the first leg portion limits the travel of the outer race of the outboard bearing assembly in an outboard direction and such that the second leg portion is operable to retain lubricant for the outboard bearing assembly, the inner bearing race having an outboard surface, the second leg having an outboard surface which is positioned axially inboard of the outboard surface of the inner bearing race, and whereby upon attaching the hub to the axle by a mechanical connector a force is applied against the outboard surface of the inner bearing race without engaging the outboard surface of the second leg portion of the cap, the second leg portion of the cap also having an inboard surface opposite the outboard surface of the second leg portion, the inboard surface of the second leg portion being spaced from the cage, whereby the axle, mechanical connector and cone assembly are free to rotate without contacting the second leg portion of the cap.

17. A wheel hub assembly according to claim 12 in which said at least one alignment element comprises a first alignment element positioned adjacent to the inboard side of the outboard bearing assembly and a second alignment element positioned adjacent to the outboard side of the inboard bearing assembly.

18. A wheel hub assembly according to claim 17 in which each of the first and second alignment elements are annular and include a central opening, the first alignment element including a first leg portion extending axially in an inboard direction away from the inboard side of the outboard bearing assembly and a second leg portion extending inwardly toward the longitudinal axis of the bore at a location spaced from the inboard side of the outboard bearing assembly, the first alignment element being operable to retain lubricant against the inboard side of the outboard bearing assembly, the second alignment element having a first leg portion extending in an outboard direction away from the outboard side of the inboard bearing assembly and a second leg portion extending inwardly toward the longitudinal axis of the bore at a location spaced from the outboard side of the inboard bearing assembly, the second alignment element being operable to retain lubricant against the outboard side of the inboard bearing assembly.

19. A wheel hub assembly according to claim 18, in which a gap exists between the outer surface of the spacer and the respective second legs of the first and second alignment elements when the hub is attached to the axle by a mechanical connector, whereby the sleeve is free to rotate without engaging the first and second alignment elements and whereby the first and second alignment elements maintain the sleeve in substantial alignment with the inboard and outboard bearings during installation of the axle.

20. A wheel hub assembly according to claim 19, including first and second annular recesses in the interior bore wall of the hub body positioned to receive the respective first and second alignment elements to thereby retain the first and second alignment elements in position with the second leg of the first alignment element spaced from the outboard bearing assembly and the second leg of the second alignment element spaced from the inboard bearing assembly.

21. A wheel hub assembly according to claim 17 further including a seal at the inboard side of the inboard bearing and a lubrication retaining cap between the seal and cage of the inboard bearing assembly, the lubrication retaining cap being operable to retain lubrication at the inboard side of the inboard bearing assembly.

22. A wheel hub assembly providing easy mounting onto an axle, comprising:

a hub body having an inboard side and an outboard side and a longitudinal bore through the body, the bore extending from the inboard side of the hub to the outboard side of the hub, the bore being bounded by a wall;

an outboard bearing assembly located within the bore adjacent to the outboard side of the hub body, an inboard bearing assembly located within the bore adjacent to the inboard side of the hub body, the outboard bearing assembly and the inboard bearing assembly each having an inner surface of a cross sectional dimension which is sized to engage an axle inserted through the bore and bearing assemblies, the outboard and inboard bearing assemblies each having respective inboard and outboard sides;

a spacer located within the bore and coupled to the first and second bearing assemblies to maintain a desired spacing of the bearing assemblies along the longitudinal bore, the spacer having an inboard end and an outboard end and including an axially extending axle receiving opening therethrough, the spacer having an inner surface bounding the axle receiving opening and an opposed outer surface;

a cap coupled to the outboard end of the bore in a position to retain the outboard bearing assembly within the bore, the cap comprising an annular cap inserted into the outboard end of the bore, wherein, the bore has a longitudinal axis, the annular cap having an axially extending first leg portion positioned adjacent to the wall of the bore and an inwardly extending second leg portion extending inwardly toward the longitudinal axis of the bore, the outboard bearing assembly having an outer cup or race, tapered rollers, a cage and an inner bearing cup or race, the inner race together with the tapered rollers and cage comprising a cone assembly, wherein the first and second leg portions of the cap are in position such that the first leg portion limits the travel of the outer race of the outboard bearing assembly in an outboard direction and such that the second leg portion is operable to retain lubricant for the outboard bearing assembly, the inner bearing race having an outboard surface, the second leg having an outboard surface which is positioned axially inboard of the outboard surface of the inner bearing race, and whereby upon attaching the hub to the axle by a mechanical connector a force is applied against the outboard surface of the inner bearing race without engaging the outboard surface of the second leg portion of the cap, the second leg portion of the cap also having an inboard surface opposite the outboard surface of the second leg portion, the inboard surface of the second leg portion being spaced from the cage, whereby the axle, mechanical connector and cone assembly are free to rotate without contacting the second leg portion of the cap.

23. A wheel hub assembly according to claim 20 including a cap retainer positioned within a recess provided in the bore, the cap retainer having a cap engaging portion positioned outboard of the second leg portion and adapted to engage the second leg portion to retain the cap within the bore.

24. A wheel hub assembly according to claim 21 wherein the cap retainer comprises a snap ring.

25. A wheel hub assembly according to claim 21 wherein the cap is press fit within the bore.

26. A wheel hub assembly providing easy mounting onto an axle, comprising:

a hub body having an inboard side and an outboard side and a longitudinal bore through the body and extending from the inboard side to the outboard side, the bore being bounded by a wall;

an outboard bearing assembly located within the bore adjacent to the outboard side of the hub body, an inboard bearing assembly located within the bore adjacent to the inboard side of the hub body, the outboard bearing assembly and the inboard bearing assembly each having an inner surface of a cross sectional dimension which is sized to engage an axle inserted through the bore and bearing assemblies, the outboard and inboard bearing assemblies each having respective inboard and outboard sides;

a spacer located within the bore and coupled to the first and second bearing assemblies to maintain a desired spacing of the bearing assemblies along the longitudinal bore, the spacer having an inboard end and an outboard end and including an axially extending axle receiving opening therethrough, the spacer having an inner surface bounding the axle receiving opening and an opposed outer surface;

at least a first alignment element and a second alignment element positioned between the bore and the spacer so as to substantially align the longitudinal axis of the spacer with the longitudinal axis of the bore;

a cap coupled to the outboard end of the bore in a position to retain the outboard bearing assembly within the bore, the cap comprising an annular cap inserted into the outboard end of the bore, the bore having a longitudinal axis, the annular cap having an axially extending first leg portion positioned adjacent to the wall of the bore and an inwardly extending second leg portion extending inwardly toward the longitudinal axis of the bore, the outboard bearing assembly having an outer cup or race, tapered rollers, a cage and an inner bearing cup or race, the inner race together with the tapered rollers and cage comprising a cone assembly, wherein the first and second leg portions of the cap are in position such that the first leg portion limits the travel of the outer race of the outboard bearing assembly in an outboard direction and such that the second leg portion is operable to retain lubricant for the outboard bearing assembly, the inner bearing race having an outboard surface, the second leg having an outboard surface which is positioned axially inboard of the outboard surface of the inner bearing race; and the first alignment element being positioned adjacent to the inboard end of the outboard bearing assembly and the second alignment element being positioned adjacent to the outboard end of the inboard bearing assembly, wherein each of the first and second alignment elements are annular and include a central opening, the first alignment element including a first leg portion extending axially in an inboard direction away from the inboard side of the outboard bearing assembly and a second leg portion extending inwardly toward the longitudinal axis of the bore at a location spaced from the inboard side of the outboard bearing assembly, the first alignment element being operable to retain lubricant against the inboard side of the outboard bearing assembly, the second alignment element having a first leg portion extending in an outboard direction away from the outboard side of the inboard bearing assembly and a second leg portion extending inwardly toward the longitudinal axis of the bore at a location spaced from the outboard side of the inboard bearing assembly, the second alignment element being operable to retain lubricant against the outboard end of the inboard bearing assembly.

27. A wheel hub assembly according to claim 26, including first and second annular recesses in the interior bore wall of the hub body positioned to receive the respective first and second alignment elements to thereby retain the first and second alignment elements in position with the second leg of the first alignment element spaced from the outboard bearing assembly and the second leg of the second alignment element spaced from the inboard bearing assembly, the wheel hub assembly further including a seal at the inboard side of the inboard bearing and a lubrication cap between the seal and cage of the inboard bearing assembly, the lubrication retaining cap being operable to retain lubrication at the inboard side of the inboard bearing assembly.

28. A wheel hub assembly according to claim 26 including a cap retainer positioned in a recess provided in the bore outboard of the cap to retain the cap in the bore.

29. A wheel hub assembly according to claim 28 in which the cap is press fit into the bore.

30. A wheel hub assembly according to claim 26 in combination with an axle and a mechanical connector attaching the hub assembly to the axle, such that upon attaching the hub assembly to the axle by the mechanical connector a force is applied against the outboard surface of the inner bearing race without engaging the outboard surface of the second leg portion of the cap, the second leg portion of the cap also having an inboard surface opposite the outboard surface of the second leg portion, the inboard surface of the second leg portion being spaced from the cage, whereby the axle, mechanical connector and cone assembly are free to rotate without contacting the second leg portion of the cap, a gap existing between the outer surface of the spacer and the respective second legs of the first and second alignment elements when the hub is attached to the axle by the mechanical connector, whereby the sleeve is free to rotate without engaging the first and second alignment elements when the hub is attached to the axle and the first and second alignment elements maintain the sleeve in substantial alignment with the inboard and outboard bearings during installation of the axle.

31. A method of installing a wheel hub on an axle, the wheel hub including a hub body having a bore bounded by a wall, the bore extending from an outboard side of the body to an inboard side of the body, the hub further including an inboard bearing and an outboard bearing, each with a respective inboard side and outboard side, and a spacer located within the bore in position to maintain spacing between the bearings, wherein the spacer and the bearings each have an inner surface which defines an axle receiving opening therethrough, the spacer also having an outer surface opposed to the inner surface of the spacer, the method comprising:

(a) engaging the outer surface of the spacer during installation of the wheel hub onto the axle, the inner surface of the engaged spacer being substantially aligned with the inner surfaces of the inboard and outboard bearings;

(b) retaining the outboard bearing in the bore with an apertured cap;

(c) positioning the inboard side of the bore onto the axle and guiding the hub further onto the axle until the axle protrudes at least partially through the apertured cap;

(d) attaching the hub to the axle; and (e) disengaging the outer surface of the spacer such that when the outer surface is disengaged the spacer is free to rotate relative to the hub without engagement of the outer surface of the spacer.

32. A method according to claim 31 in which the act of disengaging the outer surface of the spacer comprises disengaging the outer surface of the spacer upon attaching the hub to the axle with a mechanical connector.

* * * * *